Patented Jan. 1, 1946

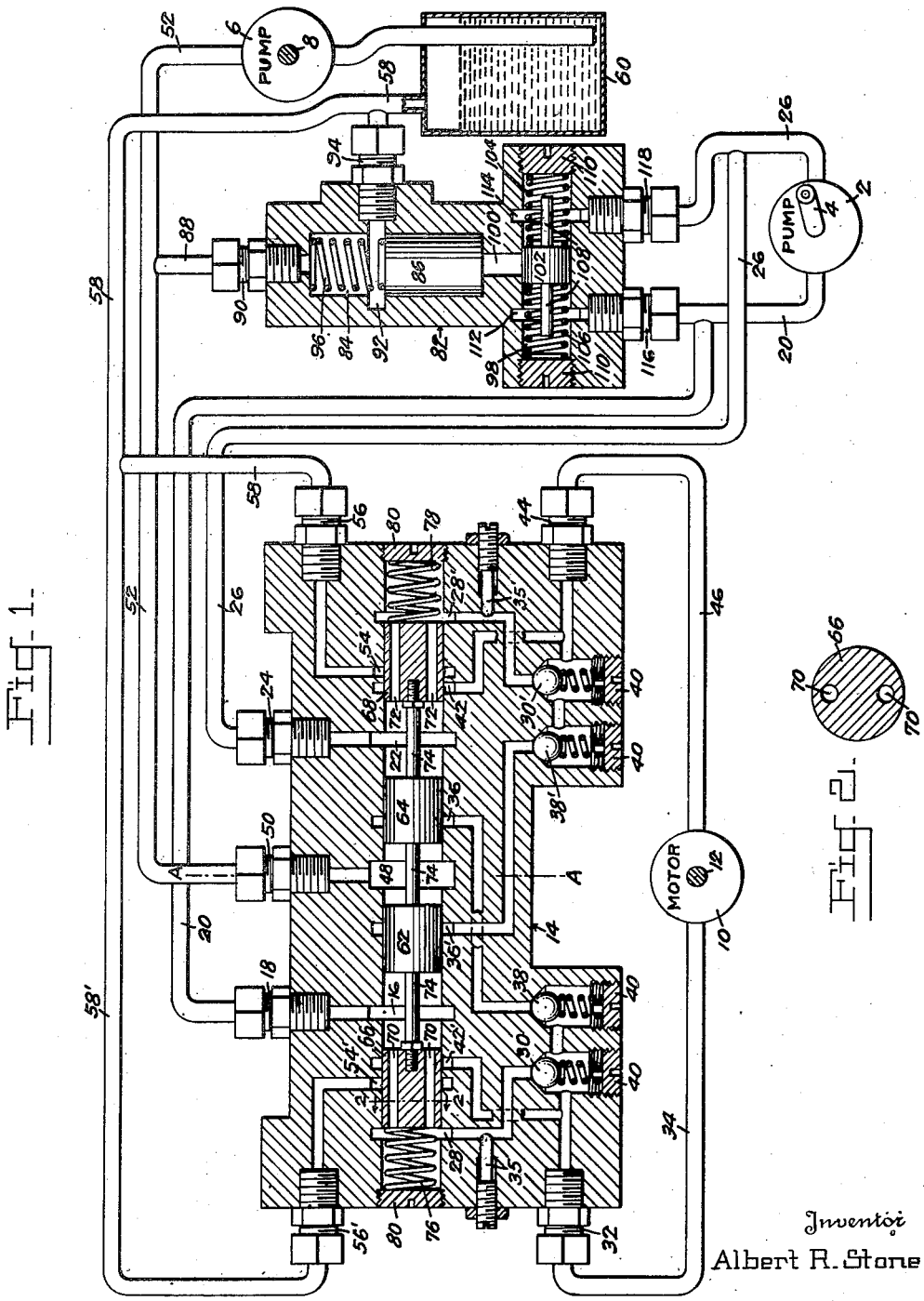

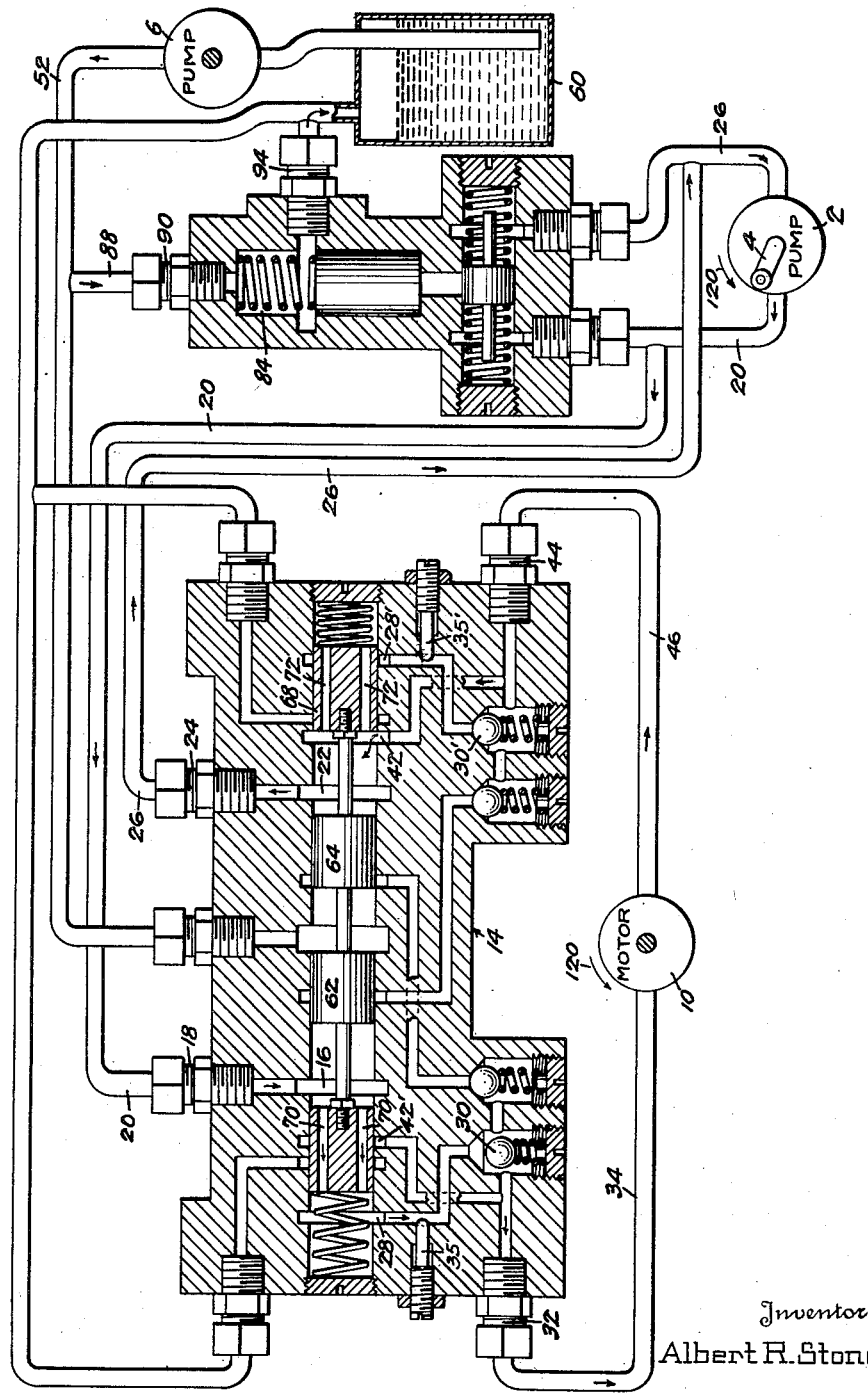

2,391,930

UNITED STATES PATENT OFFICE 2,391,930

POWER TRANSMISSION SYSTEM

Albert R. Stone, Belair, Md.

Application December 1, 1942, Serial No. 467,545

7 Claims. (Cl. 60—53)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a system for the transmission of power by fluid pressure involving manually-operated control means and has special reference to such a system wherein a power-operated pump is automatically brought in to supplement the action of a manually operated pump.

In this system, control of power transmission to the motor, which in turn delivers the power to a tool or other device operated thereby, is effected by the operator's movement of the hand pump. When operating at small angular velocities and/or against small motor loads, the system functions as a closed hydraulic circuit wherein the angular velocity of the motor varies with the angular velocity of the hand pump. When the hand pump is delivering fluid to the motor, an increase in the angular velocity of the hand pump causes a delivery of greater amount of fluid to the motor. Before this increase in the amount of fluid is discharging from the motor at the rate it is fed thereto, a back pressure in the line from the hand-operated pump to the motor builds up and prevails while said increase in angular velocity of the hand pump is maintained. Also, if the load on the motor is increased, it serves to slow up the motor and impede the discharge of fluid, thereby also serving to build up a back pressure in the line from the hand-operated pump to the motor until this latter back pressure is sufficient to discharge the fluid from the motor at the rate it is fed thereto.

Among the objects of this invention is to provide means for utilizing this back pressure in the line from the hand-operated pump to the motor, whether this back pressure results from either a speeding up in the angular velocity of the hand pump, an increase in the load on the motor, or a combination of these causes resulting in such back pressure, to automatically effect an introduction of fluid from a power-driven pump into the feed line from the hand-operated pump to the motor.

The object is accomplished by a valve having a plurality of ports connected by conduits to the pumps and the motor. Actuation of the hand pump causes a pressure difference between its discharge and intake which moves a reciprocating member in the valve to uncover certain of the ports, permitting fluid flow to the motor.

The power operated pump has a by-pass connecting its discharge and intake which is adapted to be closed upon the occurrence of a predetermined minimum pressure difference between discharge and intake of the manual pump. This pressure difference rises to the set minimum either upon increasing the speed of operation of the manual pump, or upon the occurrence of unusual resistance to operation of the motor, as will be described.

The specific nature of the invention as well as other objects and advantages thereof will clearly appear from a description of a preferred embodiment as shown in the accompanying drawings in which:

Fig. 1 of the drawings shows a system embodying the invention. In this figure, the parts occupy the positions taken during no power transmission.

Fig. 2 is a section through one of the cover members, being substantially on line 2—2 of Fig. 1.

Fig. 3 shows the position the parts occupy during power transmission from the manual pump to the motor.

Figure 4:
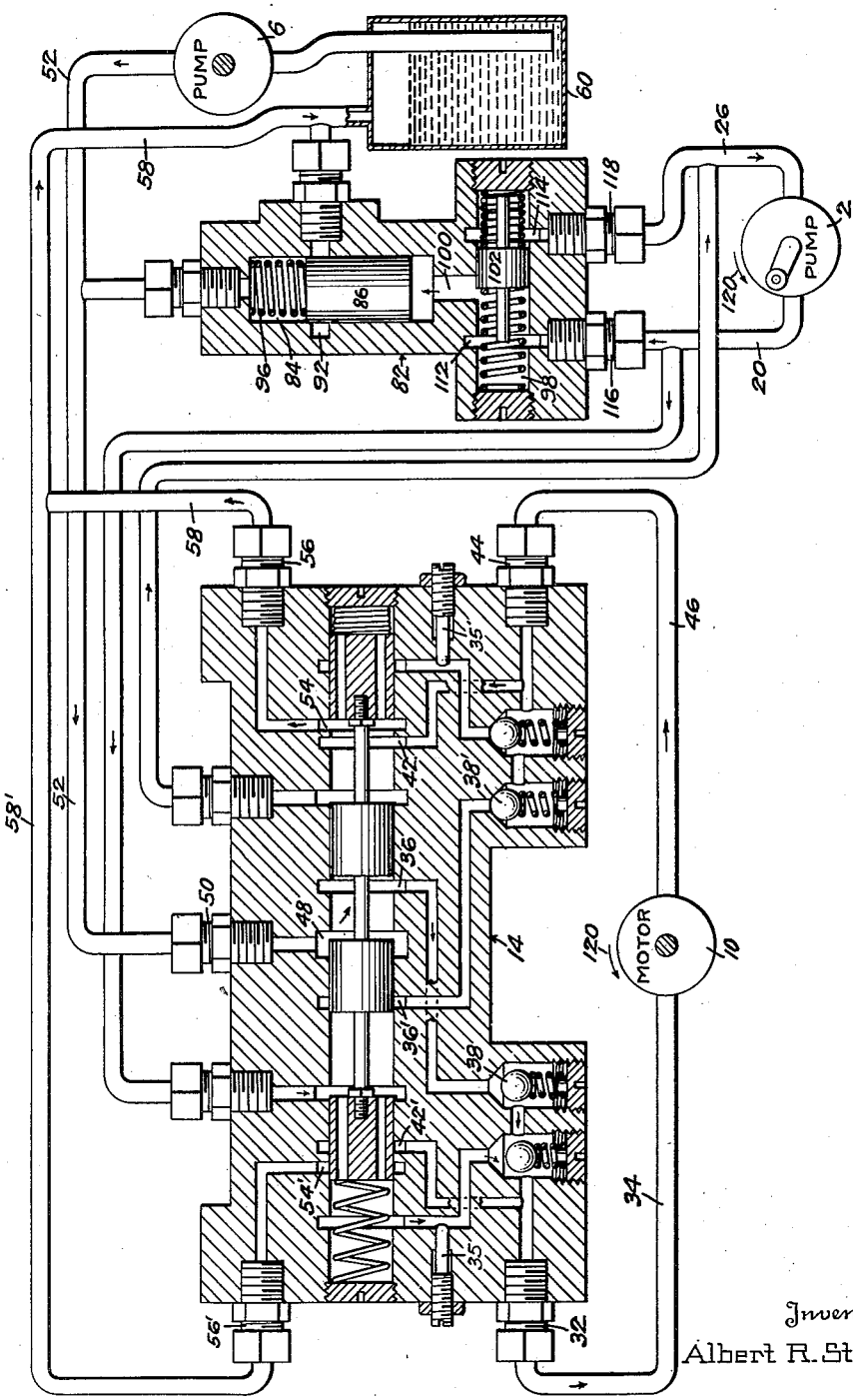
Fig. 4 shows the position the parts occupy during power transmission from both pumps to the motor.

Referring now particularly to Figs. 1 and 2, a manually operable pump 2 is shown with a hand crank 4. A power operated pump 6 has a shaft 8 for connection to a suitable drive motor, not shown. Pumps 2 and 6 are connected to drive a fluid operated motor 10 which has a shaft 12 for connection to a suitable power utilizer, not shown. The connections are by way of a valve 14 which is provided with ports and a reciprocable member to cover and uncover those ports in accordance with the power requirements. The discharge of pump 2 is connected to a port 16 by way of nipple 18 and conduit 20. The intake of pump 2 is connected to port 22 through nipple 24 and conduit 26.

It should be noted here that valve 14 is symmetrical about a vertical center line A—A, and that pump 2 and motor 10 are reversible. The system, therefore, is reversible, and the terms "discharge" and "intake" as applied to pump 2 and the motor are interchangeable, depending for their application upon the direction of rotation of pump 2. However, for the sake of simplicity, the system is described on the basis of rotation in one direction. Its operation in the reverse direction can thereafter be considered.

The intake of motor 10 is connected to a port 28 through a spring biased ball check valve 30.

a nipple 32, and a conduit 34. A valve 35 is preferably provided in the passage between port 28 and check valve 30. Such a valve permits variation of the size of the passageway, for a purpose set forth below. Another port 36 is also connected to nipple 32 by way of a spring biased ball check valve 38. The tension of the springs in the check valve assemblies may be regulated by plugs 40 having threaded engagement with the body valve 14. The discharge of motor 10 is connected to port 42 through nipple 44 and conduit 46.

Power operated pump 6 is connected to discharge into port 48 of the valve by way of nipple 50 and conduit 52. The pump intake is connected to ports 54 and 54' through nipples 56 and 56', and conduits 58 and 58' respectively, and reservoir 60.

Inside the valve, a pressure sensitive reciprocating member covers and uncovers the various ports, as will be described. The pressure sensitive members are the pistons 62 and 64, which also serve as covering members for certain of the ports. Additional cover members 66 and 68 serve to cover and uncover other ports. Each cover member 66 and 68 is provided with one or more longitudinal passages 70 and 72, respectively. The various members 62, 64, 66, and 68 are joined mechanically by rods 74 and reciprocate together as a unitary reciprocating member. This member is biased toward a central, or neutral, position by springs 76 and 78 adjustably held in place by plugs 80 which have threaded engagement with the valve body.

Power operated pump 6 is provided with a by-pass in which a valve body 82 is interposed. In the valve body there is a piston chamber 84 to slidably accommodate a piston 86. Chamber 84 has fluid pressure communication with the power pump discharge through the conduits 52 and 88, and nipple 90. A port 92 in the chamber is connected to conduit 58 and the power pump intake through a nipple 94. A spring 96 in the chamber biases piston 86 into a position to keep port 92 uncovered.

The body of valve 82 is provided with a pressure chamber 98 which has a single fluid pressure connection 100 with piston chamber 84. A piston 102 in the pressure chamber is centered by springs 104 and 106 to normally cover connection 100. Piston 102 is preferably provided with positive stop rods 108 which are adapted to engage spring adjusting plugs 110 having threaded engagement with the valve body. Pressure chamber 98 is ported as at 112 and 114 on each side of the piston. Port 112 communicates with manual pump conduit 20 through nipple 116, and port 114 communicates with conduit 26 through nipple 118.

Operation.—Referring now to Fig. 3, the operation of the system will be described for rotation of the manual pump and the motor in the direction indicated by arrows 120, and under conditions not requiring power from power pump 6.

Pump 2 is operated by manually turning crank 4. The pressure is transmitted through conduit 20, nipple 18 and port 16 into the valve body. The suction on the pump intake is transmitted through conduit 26, nipple 24 and port 22 to the valve interior. The pressure difference between the right side of piston 64 and the left side of piston 62 moves the entire reciprocating unit to the right as seen in the drawings with the result that covering member 68 uncovers port 42. Simultaneously, flow of pressure fluid starts from port 16 to motor 10 through passages 70, port 28, check valve 30, nipple 32 and conduit 34. From the motor the flow is through conduit 46, nipple 44, port 42, port 22, nipple 24, and conduit 26 back to pump 2. If motor 10 tends to run too fast, the difference in pressure between intake side and discharge side of the motor falls below the operating pressure for the load previously established, thereby automatically moving the reciprocating member in the valve to the left to cover port 42 and stop the circulation of fluid from the motor.

It will readily be seen by those skilled in the art that for rotation in the reverse direction, the reciprocable unit in valve 14 would shift to the left, whereupon the flow would be from pump 2 through conduit 26, nipple 24, port 22, passages 72, port 28', check valve 30', nipple 44, and conduit 46 to the motor in the direction opposite to that indicated by the arrows. From the motor, flow would be through conduit 34, nipple 32, port 42', port 16, nipple 18, and conduit 20 back to manual pump 2.

In both of the above-described sequences of operation, power pump 6 merely circulates fluid through its by-pass between conduit 52 and tank or reservoir 60, by way of conduit 88, nipple 90, piston chamber 84 and nipple 94.

Let it be now assumed that hand pump 2 is operated at a high rate of speed, or that motor 10 is momentarily so loaded as to offer increased resistance to turning. Either of these new assumed operating conditions will materially increase the pressure differential between the discharge and intake of the manual pump, resulting in a new location of the moving parts of the control mechanism, as shown in Fig. 4. Here, the increased pressure difference has shifted the reciprocable unit still farther to the right, uncovering ports 36 and 54. The pressure difference is also transmitted to pressure chamber 98 of valve 82, shifting piston 102 to the right to uncover port 100. The overload of motor 10 and the pressure from the discharge of manual pump 2 are thereupon transmitted through conduit 20, nipple 116, ports 112 and 100, into the space in piston chamber 84 below the piston 86. Piston 86 is thereupon moved against spring 96 to cover port 92, closing the by-pass. Power pump 6, in continuous operation, then discharges through the motor as follows: conduit 52, nipple 50, ports 48 and 36, check valve 38, and conduit 34 to motor 10. The return circuit is conduit 46, nipple 44, ports 42 and 54, nipple 56, conduit 58, reservoir 60 and power pump 6.

The pressure of fluid available in conduit 52 and port 48 is the sum of a constant, established by the force of spring 96 acting on piston 86, and a variable, caused by fluid pressure from hand pump 2 acting through conduit 100 when piston 102 is moved off center. A pressure difference between fluid in port 48 and fluid in ports 28 or 28' is always maintained in my improved construction and overcomes resistance to flow of fluid through check valves 38 or 38' and compensates for loss of pressure due to the orifice effect of small openings of ports 36 and 36'. This contributes materially to the smooth blending operation of my device, a novel feature characteristic thereof.

The fluid circuit between manual pump 2 and motor 10 remains as described above, and need not be repeated here.

Where the conditions for the use of the power pump to drive the motor obtain for rotation opposite to that indicated by arrows 120, the operation will be similar to that just detailed. It is of course understood that the operation of power pump 6 continues constant; pump 6 does not reverse its rotation. When the direction of rotation of pump 2 is reversed, and the pressure difference between discharge and intake equals or exceeds a predetermined minimum, piston 102 will shift to the left instead of as shown, but piston 86 will still close the by-pass, because of pressure transmitted from conduit 26 through nipple 118, and ports 114 and 100. Since reversed rotation is assumed, the reciprocable member of valve body 14 is shifted to the left, uncovering ports 36', 42' and 54'. Flow for the power pump is as follows: conduit 52, nipple 50, ports 48 and 36', check valve 38', nipple 44 and conduit 46 to the motor. Return flow is by way of conduit 34, nipple 32, ports 42' and 54', nipple 56', conduits 58' and 58, and reservoir 60 back to the pump.

As before, the fluid circuit for manual pump 2 for this direction of rotation has been detailed above and need not be repeated here.

It has been found desirable to provide the adjustable orifices or valves 35 and 35' in the conduits from ports 28 and 28', respectively, for regulating the flow of fluid to the motor 10 from the pump 2. Speeding up the hand crank 4 of the pump increases the volume of fluid to the motor. The regulating valves 35 and 35', however, offer additional means for controlling flow of fluid to the motor 10.

The pressure of the fluid supplied by or available from the power pump 6 is controlled by the by-pass valve 82. This pressure is always slightly higher than the pressure from the hand pump, although augmented at times by an overload or motor 10 as above set forth.

With this device the supplementing of power to the motor from the power pump takes place smoothly and evenly, as well as automatically, with the requirements, instead of abrupt supplementation. Also, by varying the pressure of the balancing springs 76 and 78 in valve 14, the springs on the ball checks 38, 38', 38 and 38' and the springs in chamber 98 of the valve 82, the fluid from the power pump can be brought into supplementation with the fluid from the hand-operated pump at almost any desired load or speed condition.

In case of failure of the power pump, the system continues to operate as a simple hydraulic circuit from the hand-operated pump to the hydraulic motor 10.

I claim:

1. A system for transmitting power by fluid pressure, comprising a manually operable pump having an intake and a discharge, a fluid operated motor having an intake and a discharge, a fluid conduit connecting the manual pump discharge with the motor intake, a fluid conduit connecting the motor discharge with the manual pump intake, a power operated pump having an intake and a discharge, means connecting said power pump discharge and intake with said motor intake and discharge respectively, a by-pass conduit connected to the power pump discharge and intake, a valve body having a piston chamber which forms a part of the by-pass, a piston in the chamber reciprocable to close the by-pass, a fluid pressure chamber in the body having a single fluid connection with the piston chamber, a piston reciprocable in the pressure chamber to close and open the connection with the piston chamber, and fluid pressure connections from one end of the pressure chamber to the intake of the manual pump and from the other end of said pressure chamber to the discharge of the manual pump and to the first named valve chamber.

2. A system for transmitting power by fluid pressure, comprising a manually operable pump having an intake and a discharge, a fluid operated motor having an intake and a discharge, conduits connecting said manual pump discharge and intake with said motor intake and discharge respectively, a power operated pump having an intake and a discharge, means connecting said power pump discharge and intake with said motor intake and discharge respectively, and a valve controlling said conduits and said means and responsive to an initial pressure differential between said manual pump discharge and intake to open said conduits between said manual pump and motor to operate said motor solely by said manual pump, said valve being responsive to a large pressure differential of predetermined amount between said manual pump discharge and intake to open said means connecting said power pump and motor to operate said motor jointly by said manual pump and said power pump.

3. A system for transmitting power by fluid pressure, comprising a manually operable pump having an intake and a discharge, a fluid operated motor having an intake and a discharge, conduits connecting said manual pump discharge and intake with said motor intake and discharge respectively, a power operated pump having an intake and a discharge, means connecting said power pump discharge and intake with said motor intake and discharge respectively, a by-pass interconnecting the power pump discharge and intake, a valve controlling said conduits and said means and responsive to an initial pressure differential between said manual pump discharge and intake to open said conduits between said manual pump and motor to operate said motor solely by said manual pump, said valve being responsive to a larger pressure differential of predetermined amount between said manual pump discharge and intake to open said means connecting said power pump and motor to operate said motor jointly by said manual pump and said power pump, a second valve forming part of said by-pass, and connections between said valve and the intake and discharge of said manual pump, said valve being operative to close said by-pass conduit when the pressure differential between the intake and discharge of said manual pump reaches a predetermined amount.

4. A system for transmitting power by fluid pressure, comprising a manually operable pump having an intake and a discharge, a fluid operated motor having an intake and a discharge, conduits connecting said manual pump discharge and intake with said motor intake and discharge respectively, a power operated pump having an intake and a discharge, means connecting said power pump discharge and intake with said motor intake and discharge respectively, and a valve controlling said conduits and said means and responsive to initial angular velocity of said manual pump to open said conduits between said manual pump and said motor to operate said motor solely by said manual pump, said valve being responsive to a subsequent increase in the pressure differential between said manual pump discharge and intake to open said means connecting said power pump and motor to operate said motor jointly by said manual pump and said power pump.

5. A system for transmitting power by fluid pressure, comprising a manually operable pump having an intake and a discharge, a fluid operated motor having an intake and a discharge, conduits connecting said manual pump discharge and intake with said motor intake and discharge respectively, a power operated pump having an intake and a discharge, means connecting said power pump discharge and intake with said motor intake and discharge respectively, and a valve controlling said conduits and said means and responsive to an initial pressure differential between said manual pump discharge and intake to open said conduits between said manual pump and motor to operate said motor solely by said manual pump, said valve being responsive to a larger pressure differential of predetermined amount between said manual pump discharge and intake resulting from an increased load on said motor to open said means connecting said power pump and motor to operate said motor jointly by said manual pump and said power pump.

6. A system for transmitting power by fluid pressure, comprising a manually operable pump having an intake and a discharge, a fluid operated motor having an intake and a discharge, conduits connecting said manual pump discharge and intake with said motor intake and discharge respectively, a power operated pump having an intake and a discharge, means connecting said power pump discharge and intake with said motor intake and discharge respectively, a by-pass interconnecting the power pump discharge and intake, a valve forming part of said by-pass, connections between said valve and the intake and discharge of said manual pump, said valve being operative to close said by-pass when the pressure differential between the intake and discharge of said manual pump reaches a predetermined amount, a second valve controlling said conduit between said manual pump and said motor and responsive to an initial pressure differential between said manual pump discharge and intake to open said conduits and to operate said motor solely by said manual pump, said second valve also being responsive to a larger pressure differential of a predetermined amount between said manual pump discharge and intake to open said means connecting said power pump and motor to operate said motor jointly by said manual pump and said power pump.

7. In a power-transmission system, a manual pump having an inlet and an outlet, a power operated pump having an inlet and an outlet, a motor operated by circulation of fluid therethrough and having an inlet and an outlet, a valve body having a chamber, the ends of said chamber communicating respectively with the inlet and outlet of said motor, a valve plug slidable in said chamber and having its ends exposed respectively to the ends of said chamber, said chamber being permanently connected to the inlet of said manual pump, a conduit connecting said chamber to the inlet of said power pump, another conduit connecting the power pump outlet to the motor inlet, said valve plug being so dimensioned that in one position it obstructs both of said conduits to operate said motor by said power pump, a by-pass conduit connected to the power pump inlet and outlet, a valve body having a piston chamber which forms a part of the by-pass, a piston in the chamber reciprocable to close the by-pass, a fluid pressure chamber in the body having a single fluid connection with the piston chamber, a piston reciprocable in the pressure chamber to close and open the connection with the piston chamber, and fluid pressure connections from one end of the pressure chamber to the inlet of the manual pump and from the other end of said pressure chamber to the outlet of the manual pump and to the first named valve chamber.

ALBERT R. STONE.